Patented Dec. 28, 1926.

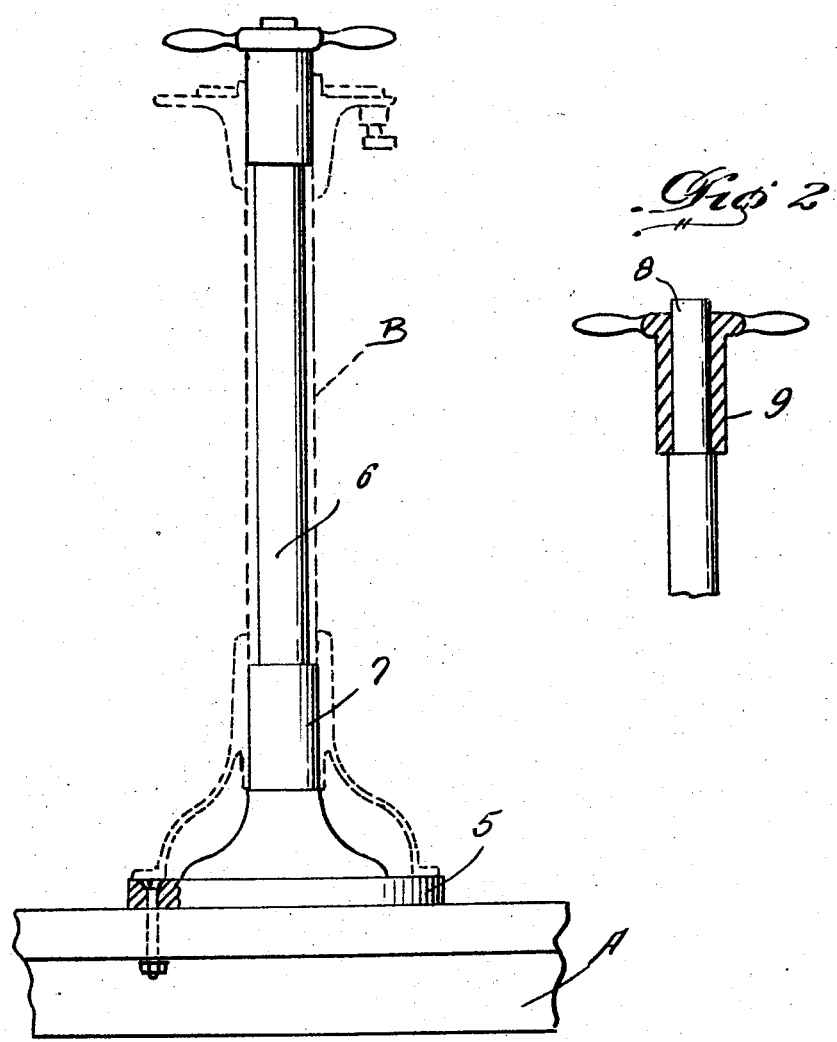

1,612,386

UNITED STATES PATENT OFFICE.

EARL RASS McATEE, OF FLAT RIVER, MISSOURI.

AXLE-HOUSING-ALIGNMENT JIG.

Application filed May 17, 1926. Serial No. 109,674.

This invention relates to an axle housing alignment jig and has for its primary object to provide extremely novel but highly efficient means for checking automobile rear axle housings that are bent, dented, or otherwise out of alignment. The invention aims to provide a jig that is so constructed as to permit an automobile rear axle housing section to be slipped thereover in an easy manner in the event the axle is in true alignment.

The invention further aims to provide a jig of this character that may be readily anchored to a machinist's work bench so as to be in position for ready use.

Other objects will become apparent as the nature of the invention will be better understood, the same comprising the novel form of jig hereinafter more fully described, when in the accompanying drawing and claimed.

In the drawing wherein like reference characters indicate corresponding parts throughout both of the views:

Figure 1 is a side elevation of an axle housing alignment jig constructed in accordance with the present invention, one section of a Ford automobile rear axle housing being disclosed in dotted line position upon the jig, and Figure 2 is a detail view partly in elevation and partly in cross section of one end of the jig.

Now having particular reference to the drawing, my novel jig consists of a metallic casting so constructed as to provide a circular base 5 that is adapted to be bolted or otherwise anchored to a machinist's work bench A, and from the center of which extends upwardly a truly perpendicular rounded post 6 that is formed in predetermined spaced relation with the base with an enlarged portion 7 while the diameter of the free end of the post is reduced as at 8, in Figure 2.

In actual use, one section of a Ford rear axle housing B is arranged over the jig in a manner as disclosed by the dotted lines in Figure 1. The diameter of the post 6 is substantially equivalent to the interior diameter of said axle housing sections, and obviously in the event the housing sections will readily slip over the jig, the same is in true alignment whereas if the section will not readily engage upon the post, the reason therefor may be readily checked, and remedied. The enlarged portion 7 of the post adjacent the base 5 is obviously to receive the bearing end of the section while the reduced end 8 of the post permits the disposition of a sleeve 9 thereon after the axle housing section has been arranged upon the post, said sleeve being turned to such a size as to snugly engage within the outer bearing receiving end of the section as clearly disclosed in Figure 1.

The base 5 of the jig permits the checking of the flared end of the housing section by reason of the fact that unless said flared end will rest snugly upon the base 5 the same is out of line and may be readily remedied while in position upon the gage, if desired.

It will thus be seen that I have provided a highly novel, simple, and efficient form of axle housing alignment jig that is well adapted for all the purposes heretofore designated.

Having thus described the invention, what I claim as new and desire to secure by Letters Patent is:—

1. In an axle housing alignment jig of the character described, a casting including an attaching base, a post extending upwardly and perpendicularly from the base and adapted to receive an axle housing section, said post having an enlarged cross sectional area at its lower end for receiving the enlarged bearing receiving end of the housing, said post being of reduced cross sectional area at its upper end, and an alignment sleeve for arrangement upon the reduced end of the post for engagement within the enlarged outer bearing receiving end of the housing section.

2. In an axle housing alingment jig of the character described, a casting including an attaching base, a post extending upwardly and perpendicularly from the base and adapted to receive an axle housing section, said post having an enlarged cross sectional area at its lower end for receiving the enlarged bearing receiving end of the housing, said post being of reduced cross sectional area at its upper end, an alignment sleeve for arrangement upon the reduced end of the post for engagement within the enlarged outer bearing receiving end of the housing section, said post and sleeve being of a diameter as to snugly engage within the section in a manner and for the purpose described.

In testimony whereof I affix my signature.

EARL RASS McATEE.